(12) United States Patent
Chen et al.

(10) Patent No.: US 7,641,509 B2
(45) Date of Patent: Jan. 5, 2010

(54) BATTERY CONNECTOR HAVING POLARIZED ARRANGEMENT

(75) Inventors: De-Jin Chen, ShenZhen (CN); Yu-San Hsiao, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/313,258

(22) Filed: Nov. 17, 2008

(65) Prior Publication Data

US 2009/0130907 A1 May 21, 2009

(30) Foreign Application Priority Data

Nov. 16, 2007 (CN) .................. 2007 2 0042304

(51) Int. Cl.
*H01R 3/00* (2006.01)
(52) U.S. Cl. .......................... 439/500; 429/96
(58) Field of Classification Search .......... 439/500, 439/627, 698; 429/96–100
See application file for complete search history.

(56) References Cited

U.S. PATENT DOCUMENTS

| | | | |
|---|---|---|---|
| 5,586,907 A * | 12/1996 | Frantz et al. | 439/500 |
| 6,062,901 A | 5/2000 | Liu et al. | |
| 6,087,037 A * | 7/2000 | Rieder | 429/99 |
| 6,530,804 B1 * | 3/2003 | Wu | 439/500 |
| 6,579,119 B1 * | 6/2003 | Wu | 439/500 |
| 6,623,293 B1 * | 9/2003 | Wu | 439/500 |
| 7,285,008 B2 * | 10/2007 | Tsai | 439/500 |

FOREIGN PATENT DOCUMENTS

TW 356291 4/1999

* cited by examiner

*Primary Examiner*—Thanh-Tam T Le
(74) *Attorney, Agent, or Firm*—Wei Te Chung; Andrew C. Cheng; Ming Chieh Chang

(57) ABSTRACT

A battery connector comprises an insulative housing comprising mounting surface and a top surface opposite to the mounting surface. A receiving chamber is defined in the housing from the top surface with first and second conductive terminals spatially arranged within the chamber. The chamber features at least a rounded corner for conforming to a rounded edge of a battery to be inserted so as to prevent the battery from being inserted incorrectly. The rounded corner has a curve surface tangent to two inner side walls of the chamber.

7 Claims, 5 Drawing Sheets

BATTERY CONNECTOR HAVING POLARIZED ARRANGEMENT

BACKGROUND OF THE INVENTION

1. Field of the Invention

The present invention relates to a battery connector, and more particularly to a batter connector provided with polarized arrangement so as to prevent incorrect insertion of a battery to be inserted therein.

2. Background of the Invention

Electrical connectors are widely applied to the electronic industry. For example, the electrical connector is used for electrical connection and signal transmittance between elements, assemblies or systems of an electronic device. The electrical connector is a necessary and basic component for constituting a whole system.

Chinese Utility Patent No. CN2466796 issued to Deyou He on Dec. 19, 2001 (hereinafter, referred to as He's '796 patent), discloses an battery connector for holding a button battery therein. Referring to the figures in the '796 patent, the battery connector comprises an insulative housing 1, a positive terminal 2 and a negative terminal 3. The insulative housing 1 disposes a flange 15 respectively in two corners of an inner wall for preventing the button battery from being inserted into the insulative housing with incorrect polarization, so as to assure correct insertion of the battery therein, ensuring battery electrodes properly in contacts with the contacts, i.e. anode for anode contact, and cathode for cathode contact. However, in additional to the flanges 15 provided, the insulative housing further comprises a narrow slit 9 for securing a contact therein respectively disposed in two corners thereof. The arrangement of the He's '796 patent is too complicated for mold design as well as the manufacturing process. This is not a cost-effective way to make it.

U.S. Pat. No. 6,062,901 issued to Liu et al. on Feb. 16, 2000 (hereinafter, referred to as Liu's '901 patent) discloses another battery connector for accommodating a button battery therein. Referring to the figures in the '901 patent, in order to prevent incorrect orientation of the battery 70 during insertion into the battery-receiving portion 24, the battery connector forms a pair of protrusions 26 vertically on a respective junction of a front wall 16 and two side walls 14. However the protrusion 26 is too vulnerable to be worn out easily, and is not friendly for manufacturing.

SUMMARY OF THE INVENTION

It is an object of the present invention is to provide a battery connector provided with polarized arrangement so as to prevent incorrect insertion of a battery to be inserted therein.

An aspect of the present invention provides a battery connector, comprises an insulative housing comprising mounting surface and a top surface opposite to the mounting surface. A receiving chamber is defined in the housing from the top surface with first and second conductive terminals spatially arranged within the chamber. The chamber features at least a rounded corner for conforming to a rounded edge of a battery to be inserted so as to prevent the battery from being inserted incorrectly.

Another aspect of the present invention provides a battery connector comprising an insulative housing defining a receiving chamber therein, the receiving chamber having inner side walls, and a first and a second conductive terminals oppositely received in the receiving chamber. An anti-mismating curved surface is formed between adjacent two inner side walls and is tangential to the adjacent two inner side walls.

The battery connector according to the embodiments of the present invention has the continuous curved surfaces, and the curved surface is tangential to the inner wall. Therefore, a transition area between the curved surface and the inner wall is smooth but does not have a slit or a sharp angle, so as to simply configuration of a die and improve molding efficiency during inject-molding process, thereby reducing manufacturing cost. Furthermore, the curved surface can better cooperate with a shape of the battery so that the curved surface is difficult to be worn. In addition, at an aspect of the present invention, the curved surfaces extend to the inserting surface from the receiving chamber which is distant from a bottom of the receiving chamber a height of at most half the length of the receiving chamber. Thus, when the battery is mounted onto the battery connector, two sides of the battery can still cooperate with the curved surfaces tightly so as to reduce shake of the battery received in the receiving chamber and further keep steady electrical connection.

BRIEF DESCRIPTION OF THE DRAWINGS

Hereinafter, the above, other objects and advantages will become more apparent from the following description for embodiments of the present invention with reference to accompanying drawings.

DETAILED DESCRIPTION OF THE EMBODIMENTS

Hereinafter, in order to make the above objects, features and advantages to be easily understood, embodiments of the present invention will be described in detail with reference to the accompanying drawings.

Figure 1:
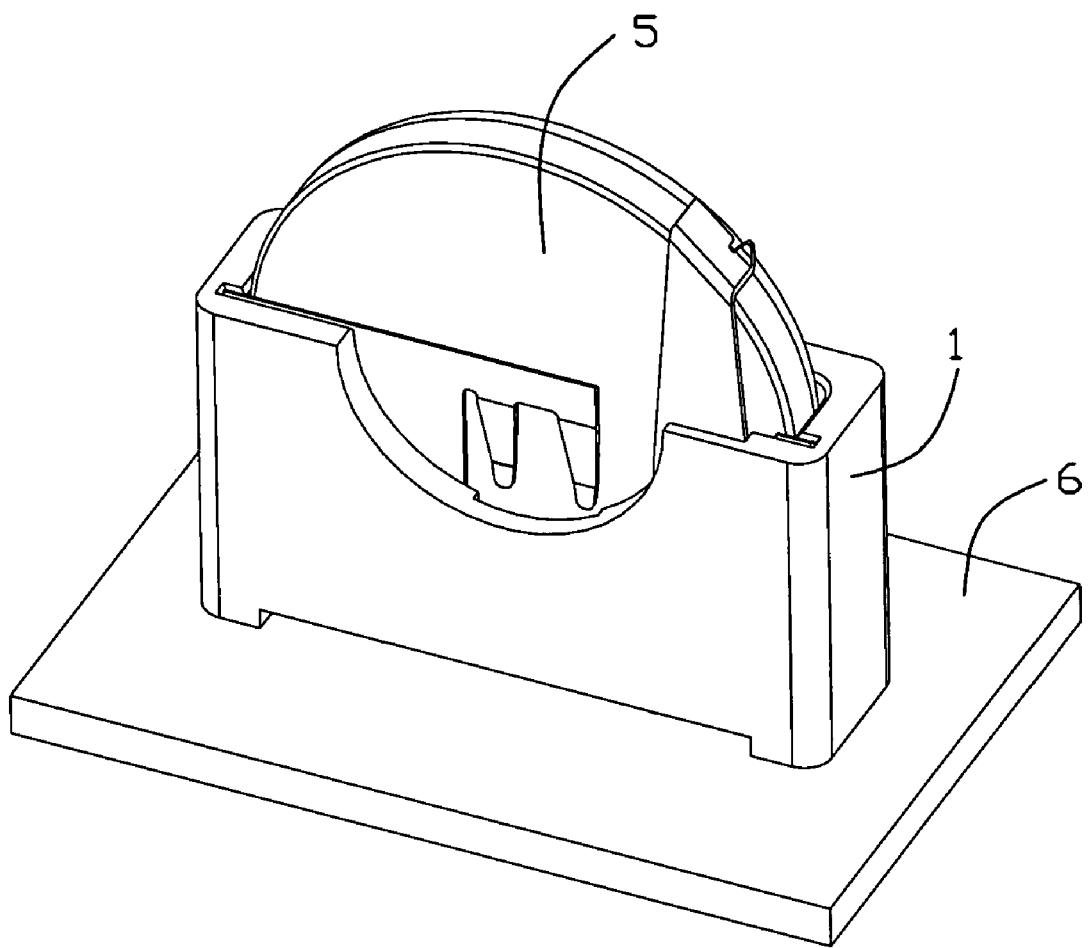
FIG. 1 is a perspective view of an battery connector which is in use in accordance with a first embodiment of the present invention, wherein a battery is mounted therein.

FIG. 1 is a perspective view of an battery connector which is in use in accordance with a first embodiment of the present invention, wherein a battery is mounted therein. Referring to FIG. 1, a battery connector 1 in accordance with a first embodiment of the present invention is configured to establish an electrical connection between a battery 5 and a printed circuit board 6.

Figure 2:
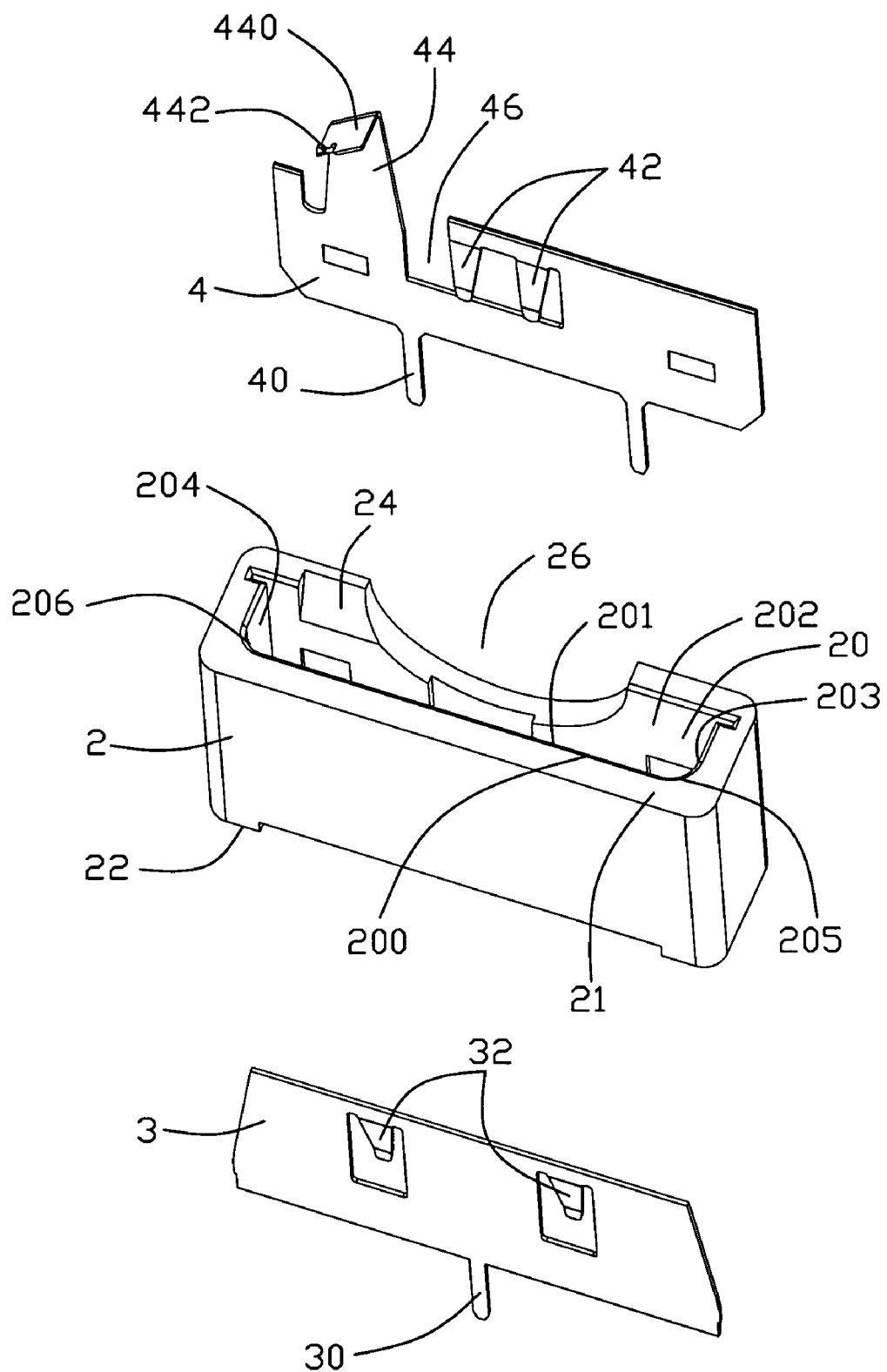
FIG. 2 is a exploded, perspective view of the battery connector of FIG. 1 taken from a different perspective.
Figure 3:
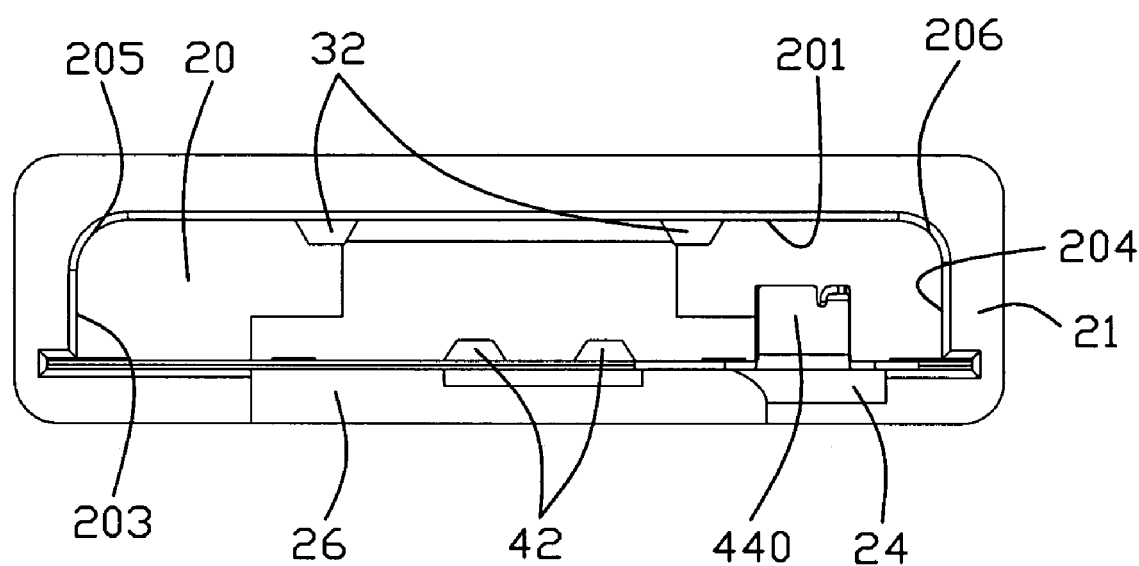
FIG. 3 is a top view of the battery connector of FIG. 1.

Referring to FIG. 1 to FIG. 3, the battery connector 1 comprises an insulative housing 2 and a first conductive terminal 3 and a second conductive terminal 4 respectively received in the insulative housing 2. The insulative housing 2 has an inserting surface 21 and a mounting surface 22 opposite to the inserting surface 21. A receiving chamber 20 having a certain length is disposed in insulative housing 2 from the inserting surface 21 toward the mounting surface 22, and comprises a rectangular inserting opening 200 formed in the inserting surface 21, a first inner wall 201, a second inner wall 202 opposite to the first inner wall 201, and a third inner wall 203 and a fourth inner wall 204 which are opposite and are perpendicular to the first inner wall 201. The first conductive terminal 3 is disposed near the first inner wall 201, and the second conductive terminal 4 is disposed near the second inner wall 202. Each of the first and the second conductive terminals 3, 4 has a mounting leg 30, 40 extending beyond the mounting surface 22 and a pair of resilient contacting portion 32, 42 projecting toward a center of the receiving chamber 20. Continuous curved surfaces 205, 206 are respectively formed on a junction of the first inner wall 201 and the third inner wall 203 and on a junction of the first inner wall and the fourth inner wall 204. The curved surface 205 on the junction of the first inner wall 201 and the third inner wall 203 is tangential to the first inner wall 201 and the third inner wall 203. The curved surface 206 on the junction of the first inner wall 201 and the fourth inner wall 204 is tangential to the first inner wall 201 and the fourth inner wall 204.

In the embodiment of the present invention, the continuous curved surfaces 205, 206 are arc surfaces, and the curved surface 205 is tangential to the first inner wall 201 and the third inner wall 203 and the curved surface 206 is tangential to the first inner wall 201 and the fourth inner wall 204. Therefore, a transition area between the curved surface 205, 206 and the inner wall is smooth but does not have a slit or a sharp angle, so as to simply configuration of a die and improve molding efficiency during inject-molding process, thereby reducing manufacturing cost. Furthermore, the curved surface 205, 206 can better cooperate with a shape of the battery 5 so that the curved surface is difficult to be worn. In addition, the curved surfaces 205, 206 extend to the inserting surface 21 from a bottom of the receiving chamber 20 or from a location of the receiving chamber 20 which is distant from a bottom of the receiving chamber 20 a height of at most half the length of the receiving chamber 20. Thus, when the battery 5 is mounted onto the battery connector 1, two sides of the battery 5 can still cooperate with the curved surfaces 205, 206 tightly so as to reduce shake of the battery 5 received in the receiving chamber 20 and further keep steady electrical connection.

The second conductive terminal 4 has a latching arm 44 extending upward from a side opposite to the mounting leg 40. The latching arm has a latching portion 440 extending towards the first conductive terminal 3. The latching arm 44 extends upward a determined height for holding the battery protruding out of the receiving chamber 20. An extending direction of the resilient contacting portion 42 is contrary to that of the latching arm 44, that is, the resilient contacting portion 42 extends downward for guiding insertion of the battery 5. A slot 46 is formed between the latching arm 44 and the resilient contacting portion 42. Such design can prolong the latching arm 44 so that the latching arm 44 has a better elasticity.

The latching portion 440 of the second conductive terminal 4 has an operating portion 442 at a free end thereof for pulling the latching portion 440 aside to release the battery 5 from the latching portion when the battery 5 is disassembled from the latching portion 440. The insulative housing 2 defines a groove 24 having a surface inclined with respect to the mounting surface. The groove 24 is in the second inner wall 202 corresponding to the latching arm 44 of the second conductive terminal 4 for increasing the deflective distance and elasticity of the latching arm 44 so that the latching arm 44 has an enough space to deflect outwardly when the battery 5 is assembled to or disassembled from the battery connector 1. The insulative housing 2 defines a semicircular cutout 26 in the second inner wall 202 corresponding to the resilient contacting portion 42 of the second conductive terminal 4 for facilitating the resilient contacting portion 42 to deflect resiliently and outwardly.

Figure 4:
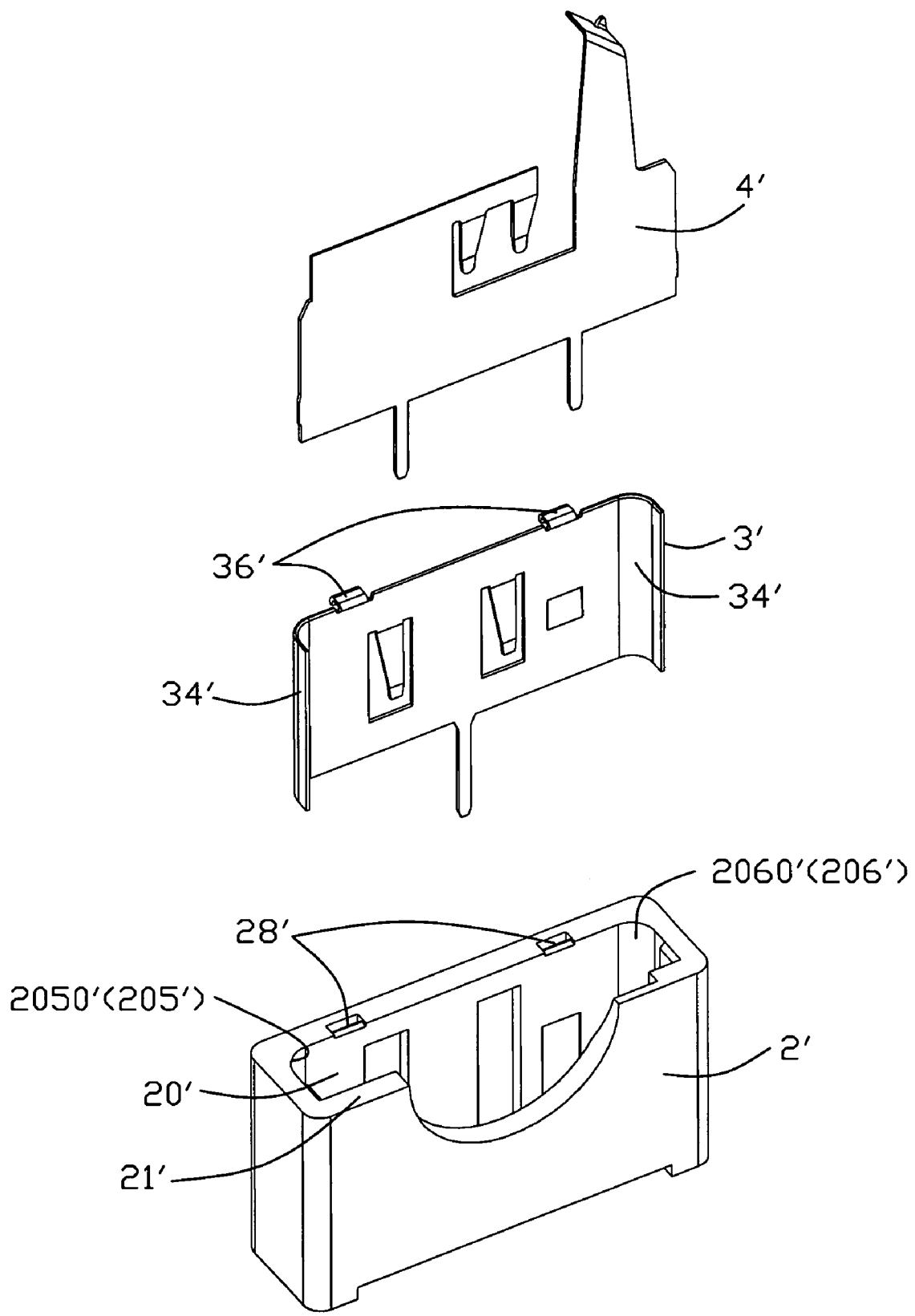
FIG. 4 is a exploded, perspective view of an battery connector in accordance with a second embodiment of the present invention.
Figure 5:
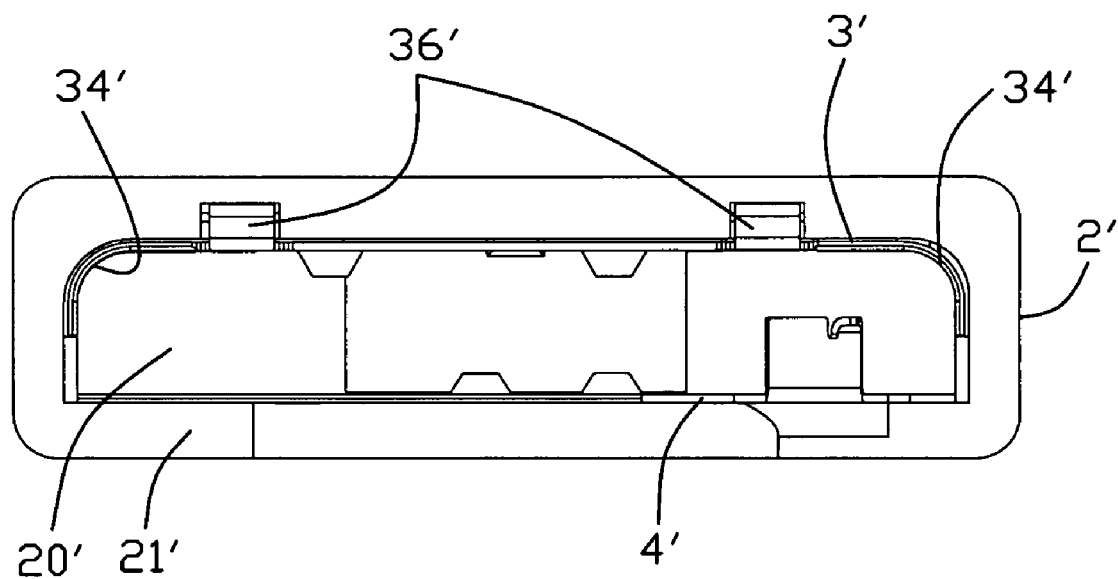
FIG. 5 is a top view of the battery connector of FIG. 4.

FIG. 4 and FIG. 5 disclose an battery connector in accordance with the second embodiment of the present invention. Referring to FIG. 4 and FIG. 5, the curved surfaces 205', 206' respectively define a concave portion 2050', 2060' near the inserting surface 21', and the first conductive terminal 3' has a crimping portion 34' extending to and just received in the concave portion 2050', 2060'. Because in the course of the battery 5 being repeatedly assembled or detached, the inserting opening of the receiving chamber 20' is subject to be badly worn. In the embodiment of the present invention, the metal first conductive terminal 3' extends to the inserting opening and cover the insulative housing 2 which is made of soft plastic, so that the curved surfaces 205', 206' have better wearability in a position near the inserting surface 21' and are difficult to be worn during assembly and disassembly of the battery 5.

The first conductive terminal 3' has a pair of clamping tabs 36' extending from a side opposite to the mounting leg and apart from the second conductive terminal 4'. The insulative housing 2' defines a pair of retaining recess 28' corresponding to the respective clamping tabs 36'. The clamping tabs 36' are received and retained in the corresponding retaining recess 28', thereby enhancing the engagement of the first conductive terminal 3' and the insulative housing 2'.

The forgoing descriptions disclose the embodiments of the present invention but do not intend to limit the present invention. Additional advantages and modifications will readily occur to those skilled in the art. Therefore, the invention in its broader aspects is not limited to the specific details and representative embodiments shown and described herein. Accordingly, various modifications and variations may be made without departing from the scope of the invention as defined by the appended claims and their equivalents.

What is claimed is:

1. A battery connector, comprising:

an insulative housing comprising a mounting surface and a top surface opposite to the mounting surface, a receiving chamber defined in the housing from the top surface with first and second conductive terminals spatially arranged within the chamber; and the chamber featured at least a rounded corner with a vertical axis for conforming to a rounded edge of a battery to be inserted along a vertical direction so as to prevent the battery from being inserted incorrectly;

wherein the rounded corner having a curve surface tangent to two vertical inner side walls of the chamber;

wherein the second conductive terminal includes a latch extending above the top surface;

wherein a groove having a surface inclined with respect to the mounting surface is defined in a vertical inner side wall of the chamber, the groove can receive the latch of the second contact therein when the latch is deformed;

wherein the second conductive terminal has a resilient contacting portion extending downwardly, a slot is formed between the latching arm and the resilient contacting portion;

wherein the insulative housing defines a semicircular cutout in an inner side wall corresponding to the resilient contacting portion of the second conductive terminal; and wherein the rounded corner defines a concave portion near the inserting surface, and the first conductive terminal has a crimping portion extending to and received in the concave portion.

2. The battery connector according to claim 1, wherein the first conductive terminal has a clamping tab extending outwardly from a side adjacent to the top surface, the insulative housing defines a retaining recess in the top surface, the clamping tab received in the retaining recess.

3. A battery connector comprising:

an insulative housing defining a receiving chamber therein, the receiving chamber having vertical inner side walls; and a first and a second conductive terminals oppositely received in the receiving chamber, wherein an anti-mismating curved surface is formed between adjacent two said inner side walls and is tangential to the adjacent two inner side walls;

wherein the insulative housing has an inserting surface and an opposite mounting surface, and the curved surface extends to the inserting surface from a location of the receiving chamber which is distant a given height from a bottom of the receiving chamber;

wherein the curved surface defines a concave portion near the inserting surface, and the first terminal comprises a crimping portion received in the concave portion;

wherein each of the first and the second conductive terminals comprises a mounting leg and a resilient contacting portion projecting towards a center of the receiving chamber; and wherein the first conductive terminal further comprises a clamping tab opposite to the mounting leg extending apart from the second conductive terminal, and the insulative housing defines a corresponding retaining recess for receiving the clamping tab.

4. The battery connector according to claim 3, wherein the insulative housing defines a cutout corresponding to the resilient contacting portion of the second conductive terminal.

5. The battery connector according to claim 3, wherein the second conductive terminal further comprises a latching arm extending opposite to the mounting leg, and the insulative housing defines a groove corresponding to the latching arm of the second conductive terminal for allowing the latching arm to deflect.

6. The battery connector according to claim 5, wherein a slot is formed between the latching arm and the resilient contacting portion of the second conductive terminal.

7. The battery connector according to claim 6, wherein the second conductive terminal further comprises an operating portion at a free end of the latching arm.

\* \* \* \* \*